No. 695,937. Patented Mar. 25, 1902.
B. G. LAMME.
ALTERNATING ELECTRIC CURRENT GENERATING AND DISTRIBUTING SYSTEM.
(Application filed July 31, 1896.)
(No Model.)
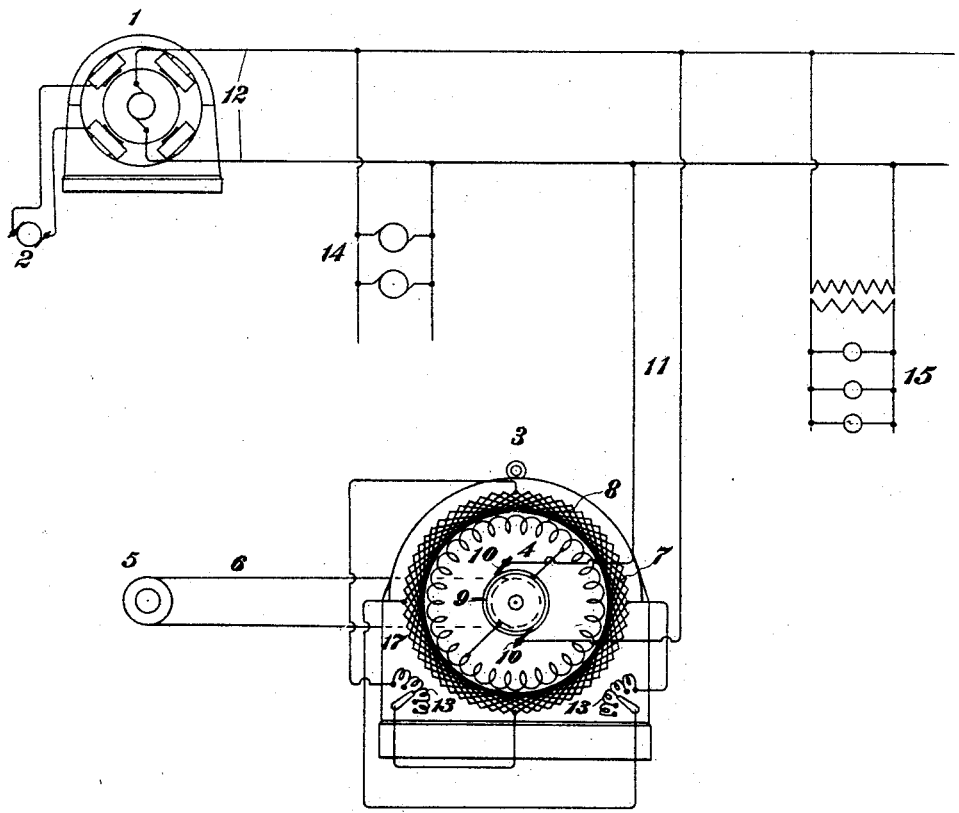
WITNESSES:
INVENTOR
Benjamin G. Lamme
BY
Attorney.

UNITED STATES PATENT OFFICE.

BENJAMIN G. LAMME, OF PITTSBURG, PENNSYLVANIA, ASSIGNOR TO WESTINGHOUSE ELECTRIC AND MANUFACTURING COMPANY, OF PITTSBURG, PENNSYLVANIA.

ALTERNATING-ELECTRIC-CURRENT GENERATING AND DISTRIBUTING SYSTEM.

SPECIFICATION forming part of Letters Patent No. 695,937, dated March 25, 1902.

Application filed July 31, 1896. Serial No. 601,183. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Alternating-Electric-Current Generating and Distributing Systems, (Case No. 709,) of which the following is a specification.

My invention relates to the generation and distribution of electrical energy; and it has for its object to utilize a machine having a secondary member provided with a closed-circuit winding as the main source of current for the work-circuit and to utilize one or more synchronous motors as the exciting means for such generator.

It has been found in practice that if the primary member of an induction-machine be supplied with alternating impulses from any suitable source and the rotatable member of such machine be mechanically driven by any suitable means at a speed above that of synchronism with the said source of alternating impulses—that is to say, at a speed exceeding the frequency of alternations divided by the number of poles—it will build up its own field by induction and supply current to the external circuit, it being understood that a complete period or cycle comprises two alternations.

If the source of exciting-current is a device or machine having a fixed rate of alternations—such, for example, as an alternating-current generator having field-magnets of fixed polarity—the rate of alternations of the system will be that of said source and will be independent of the induction-generator. I have found, moreover, that the induction-machine may be run as a generator to supply the translating devices with working current without the employment of another machine which is run continuously or regularly as a generator.

If a so-called "synchronous motor"—*i. e.,* one having field-magnets of fixed polarity—be included in the circuit, it may be utilized to afford the initial exciting-current for the induction-generator, provided such generator is first speeded up and the motor is run as a generator a sufficient length of time to effect the building up of the field of the induction-machine. The power applied to the shaft of the motor may then be discontinued. It will then run as a motor and its counter electromotive force will afford the exciting impulses necessary for the induction-generator. During the time that the synchronous motor is run as a generator it will fix the alternations of the system; but when it is run as a motor the alternations of the system will depend upon the speed of rotation, the number of poles, and the slip of the induction-machine.

Reference being had to the accompanying drawing, which illustrates diagrammatically my invention, 1 is an alternating-current motor having field-magnets of fixed polarity preferably energized by means of a separate exciter 2.

3 is an induction-machine the rotatable member 4 of which is mechanically driven by any suitable source of power, a counter-shaft and pulley 5 and a belt 6 being shown in the drawing as power-transmitting means. As the member 4 is provided with the inducing-circuit, it will for convenience be hereinafter termed the "field-magnet."

In the form of machine shown one or more closed-circuit windings 7 are applied to the stationary member or armature, and the primary winding 8 on the rotatable member or field-magnet is connected to collecting-rings 9, on which bear brushes 10. The leads 11 from the brushes 10 are connected across the mains 12, leading from the machine 1.

13 represents variable resistances, which may be included in whole or in part in the secondary or armature circuit of the machine 3, if found necessary or desirable, during the building up of the field of such machine.

It is not deemed necessary to illustrate the structural details of the induction-machine employed, since this class of machines is well known in the art, and the invention is not limited to any special construction.

14 and 15 represent translating devices supplied with current from the mains 12.

It will be understood from the foregoing description that alternating impulses derived from the motor 1 will be imparted to the primary or field-magnet winding of the generator and will constitute the necessary energy for establishing the magnetic field of such generator. It will also be understood that my invention is particularly useful in connection with circuits that are utilized either partially or wholly for operating synchronous machines, and it is of course immaterial, so far as my invention is concerned, whether such machines transform the electrical energy received by them into mechanical energy or into electrical energy of a different kind, provided they are driven by the energy received.

While I have shown an induction-generator of that type in which the primary member or field-magnet rotates, it will be understood that the reverse arrangement is included within the scope of my invention.

It will also be understood that my invention is adapted to and includes the generation of polyphase currents as well as the single-phase currents described.

I claim as my invention—

1. The combination with an electric circuit containing a motor or motors having field-magnets of fixed polarity, of a machine having a secondary winding closed upon itself and having a primary winding connected to said circuit and receiving its exciting-current solely from said motor or motors and driven as a generator to supply current to said circuit.

2. In an alternating-current generating and distributing system, the combination with a work-circuit containing motors having field-magnets of fixed polarity, of a generator for said circuit having a primary winding receiving exciting-current solely from said motors and supplying working current to said circuit and having a secondary winding closed upon itself and excited by induction from said primary winding.

In testimony whereof I have hereunto subscribed my name this 29th day of July, A. D. 1896.

BENJ. G. LAMME.

Witnesses:
HUBERT C. TENER,
WESLEY G. CARR.